United States Patent
Shirato et al.

(10) Patent No.: US 6,516,657 B2
(45) Date of Patent: *Feb. 11, 2003

(54) APPARATUS FOR MEASURING DYNAMIC LOAD CHARACTERISTICS OF WHEELS

(75) Inventors: Soichiro Shirato, Hiratsuka (JP); Ichiro Akiyama, Hiratsuka (JP)

(73) Assignee: The Yokohama Rubber Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/488,558

(22) Filed: Jan. 21, 2000

(65) Prior Publication Data

US 2002/0095979 A1 Jul. 25, 2002

(30) Foreign Application Priority Data

Jan. 22, 1999 (JP) ............................. 11-014541

(51) Int. Cl.$^7$ ............................... G01M 19/00
(52) U.S. Cl. ...................................... 73/118.1
(58) Field of Search ................. 73/118.1, 116, 73/117.3, 35.13, 65.07

(56) References Cited

U.S. PATENT DOCUMENTS

| 4,800,751 A | * | 1/1989 | Kobayashi et al. | ......... 73/118.1 |
| 4,824,180 A | | 4/1989 | Levrai | |
| 5,127,637 A | | 7/1992 | Castel | |

FOREIGN PATENT DOCUMENTS

| DE | 3726146 A1 | | 11/1988 | |
| EP | 0236947 A2 | | 9/1987 | |
| EP | 0410709 A1 | | 1/1991 | |
| GB | 2052078 A | | 1/1981 | |
| GB | 0236947 | * | 3/1987 | ........... B60G/17/00 |
| JP | 4-169827 | | 6/1992 | |
| JP | 06227225 | * | 11/1992 | ............. G01L/9/08 |
| JP | 6-227225 | | 8/1994 | |
| JP | 06227225 A | | 8/1994 | |

* cited by examiner

Primary Examiner—Eric S. McCall
Assistant Examiner—Maurice Stevens
(74) Attorney, Agent, or Firm—Arent Fox Kintner Plotkin & Kahn

(57) ABSTRACT

An apparatus for measuring dynamic load characteristics of wheels, which can be relatively easily installed on a portion between the body of the vehicle and the wheel to receive force from the road surface, which is cheap yet makes it possible to grasp the dynamic load characteristics of the wheel during the travel maintaining a sufficient degree of accuracy. The apparatus comprises a washer-type strain sensor incorporated between the body of a vehicle and a wheel, at a portion where it receives force from the road surface, e.g., at a portion where a shock absorber of the suspension system is attached to the main body of vehicle, and a means for measuring an output of the washer-type strain sensor while the vehicle is traveling.

6 Claims, 8 Drawing Sheets

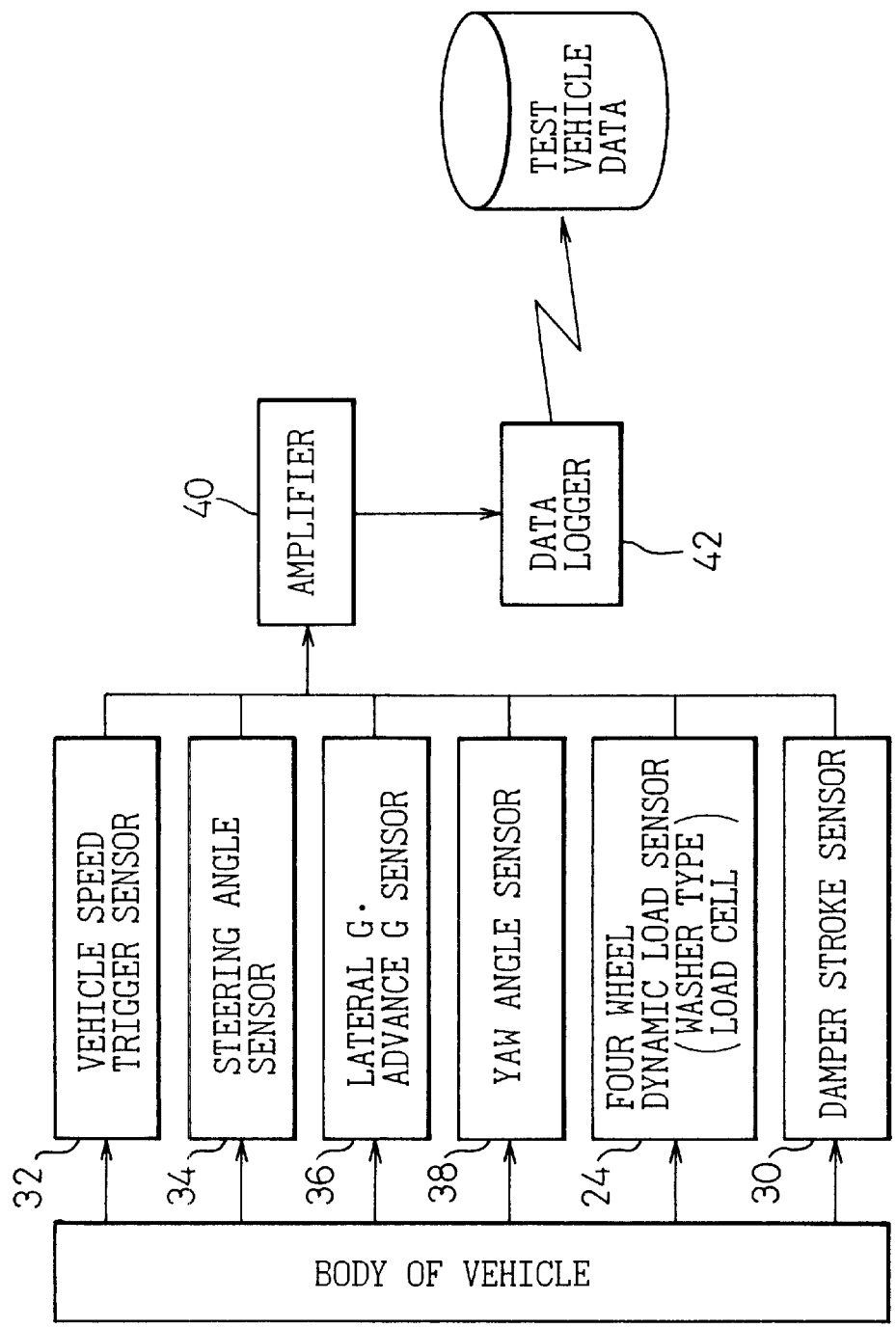

(a) SUZUKA  (b) FUJI  (c) TOKACHI

APPARATUS FOR MEASURING DYNAMIC LOAD CHARACTERISTICS OF WHEELS

BACKGROUND OF THE INVENTION

1. Field of the Invention

The present invention relates to an apparatus for measuring dynamic load characteristics of wheels (tires) of an automobile. More particularly, the invention relates to an apparatus for measuring load (dynamic load) exerted on the wheels of an automobile that is traveling.

2. Description of the Related Art

It was so far difficult to measure the load, i.e., dynamic load exerted on the four wheels of an automobile that is traveling and, hence, it has not been able to easily and fully grasp the degrees of load exerted on the tires. So far, it was generally accepted practice to measure the degree of wear of the tires after running or to measure the surface temperature of the tire treads, to infer the dynamic load exerted on the tires.

Further, it was difficult to quantitatively grasp a change in a rolling caused by a shifting amount of load between the right and left wheels, cornering performance of the test tires for the respective dynamic loads, and the marginal coefficient of friction between the tire and the road surface.

In developing tires for use in a race, it is important to quantitatively grasp the dynamic load characteristics of the test car and it inevitably becomes an indispensable requirement to measure the dynamic loads exerted on the four wheels, since such tires must satisfy turning performance, braking performance and performance on a wet road of an automobile that is constructed in an ever sophisticated manner in recent years.

According to Japanese Unexamined Patent Publication (Kokai) No. 6-227225, a quartz piezoelectric element that generates electric charge when a force is exerted thereon is incorporated in a suspension system or in a support system of a vehicle, ruggedness of the road or track is detected relying upon the magnitude and direction of the load measured by the quartz piezoelectric element, a hydraulic or pneumatic mechanism is controlled by a servo mechanism based on the detected data, in order to suppress the rolling of the vehicle caused by the ruggedness of road or track.

However, it is expensive to use such a quartz piezoelectric element disclosed in Japanese Unexamined Patent Publication (Kokai) No. 6-227225, and it is difficult to attach the quartz piezoelectric element to a suitable portion of the vehicle. Depending upon the place where the quartz piezoelectric element is installed, further, it becomes difficult to fully correctly grasp the dynamic load characteristics of the wheels during the vehicle is traveling.

SUMMARY OF THE INVENTION

In view of the above-mentioned circumstances, it is an object of the present invention to provide an apparatus for measuring dynamic load characteristics of wheels, which can be relatively easily installed on a portion between the body of the vehicle and the wheel to receive force from the road surface, which is cheap yet makes it possible to grasp the dynamic load characteristics of the wheel during the travel of the vehicle, maintaining a sufficient degree of accuracy.

In order to accomplish the above-mentioned object according to the present invention, there is provided an apparatus for measuring dynamic load characteristics of wheels, comprising a washer-type strain sensor incorporated between a body of a vehicle and a wheel at a portion where it receives force from a road surface, and a means for measuring an output of the washer-type strain sensor while the vehicle is traveling. The washer-type strain sensor is distorted depending on the dynamic load which the wheel receives from the road surface and generates a voltage corresponding to the strain.

In the present invention, the washer-type strain sensor is incorporated in a portion where a shock absorber of a suspension system is attached to the main body of the vehicle. In this case, the washer-type strain sensor is attached between the main body of the shock absorber of the suspension system of the vehicle and a spring, the lower end of which is in contact with the lower seat on the side of the wheel. Further, the washer-type strain sensor is held between the main body of the shock absorber and between it and the spring by means of a first attachment and a second attachment that are interposed between them, respectively. Therefore, the washer-type strain sensor is allowed to directly receive the load from the road surface, i.e., to directly receive the load that is received by the spring.

A recessed portion is formed in a surface of the first attachment that comes in contact with the washer-type strain sensor except for an outer circumferential portion thereof that comes in contact with the washer-type strain sensor. Being corresponded thereto, a recessed portion is formed in the surface of the washer-type strain sensor that comes in contact with the first attachment except for an outer circumferential portion thereof that comes in contact with the first attachment. Therefore, even when the washer-type strain sensor is distorted by the dynamic load of the wheel, interference of the washer-type strain sensor with the first attachment is avoided.

A surface of the washer-type strain sensor that comes in contact with the second attachment is protruded except for an outer circumferential portion thereof, and the protruded surface comes in contact with the second attachment. Accordingly, the washer-type strain sensor directly receives the load from the spring through the protruded surface.

According to the present invention, there is further provided an apparatus for measuring the dynamic load characteristics of wheels, comprising:

- a washer-type strain sensor incorporated between a body of a vehicle and a wheel, at a portion where it receives force from the road surface to detect the dynamic load of the wheel;
- a sensor for detecting a vehicle speed;
- a sensor for detecting a steering angle;
- a sensor for detecting a gravitational acceleration (G) in the lateral direction and a gravitational acceleration (G) in the longitudinal direction;
- a sensor for detecting a yawing angle of the wheel;
- a sensor for detecting a damper stroke; and
- a means that receives signals from these sensors to measure a change in a rolling caused by the shifting amount of dynamic load of the wheel, cornering performance of a test tire for respective dynamic loads, and a marginal coefficient of friction between the tire and a road surface.

According to the present invention as described above, it is made possible to correctly measure the loads on the four wheels while the vehicle is traveling, to grasp the load on the tires, cornering performance of the tires for the respective dynamic loads and marginal coefficient of friction between the tire and the road surface in terms of numerical values, and, hence, to quantitatively evaluate the specifications of the tires concerning sophisticated turning performance, braking performance and performance on a wet road.

BRIEF DESCRIPTION OF THE DRAWINGS

FIG. 6 is a view illustrating the constitution of a system for measuring the dynamic load characteristics of a wheel;

DETAILED DESCRIPTION OF THE EMBODIMENTS

Embodiments of the invention will now be described in detail with reference to the accompanying drawings.

Figure 1:
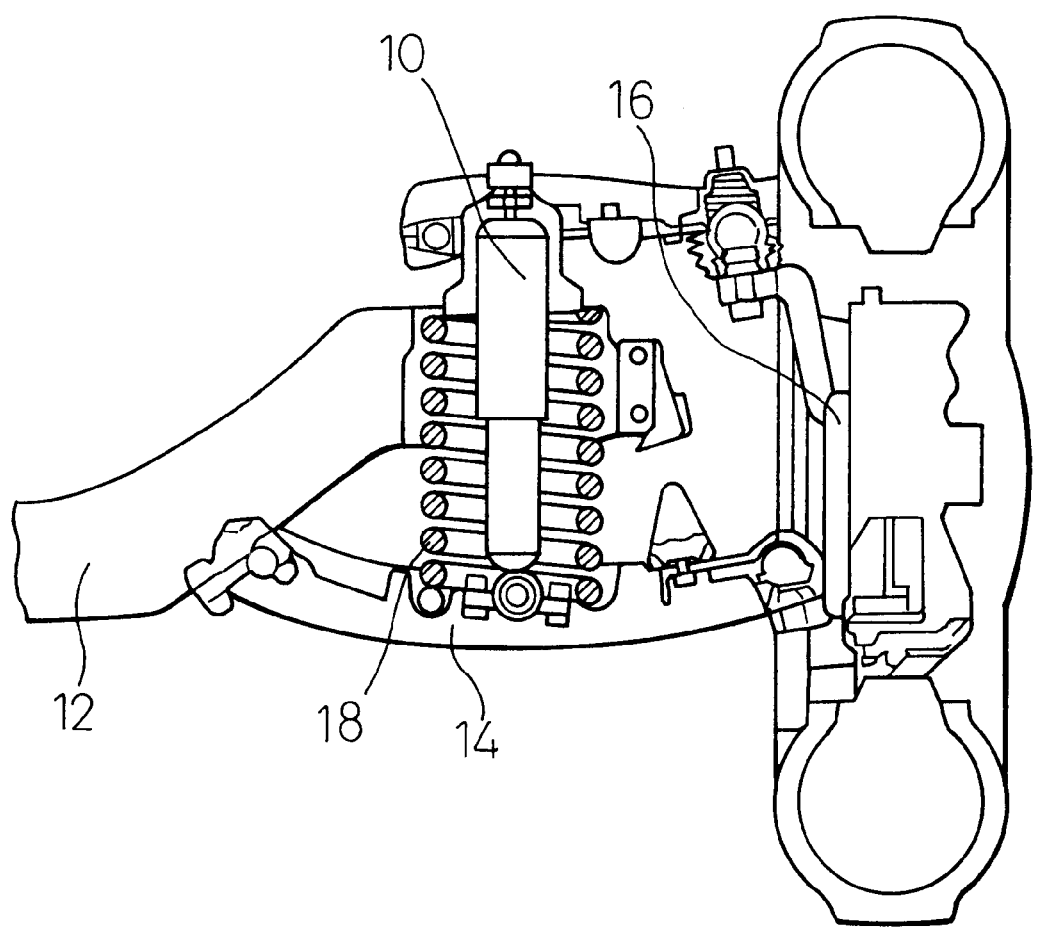
FIG. 1 is a view illustrating a shock absorber that is generally used in an automobile.
Figure 2:
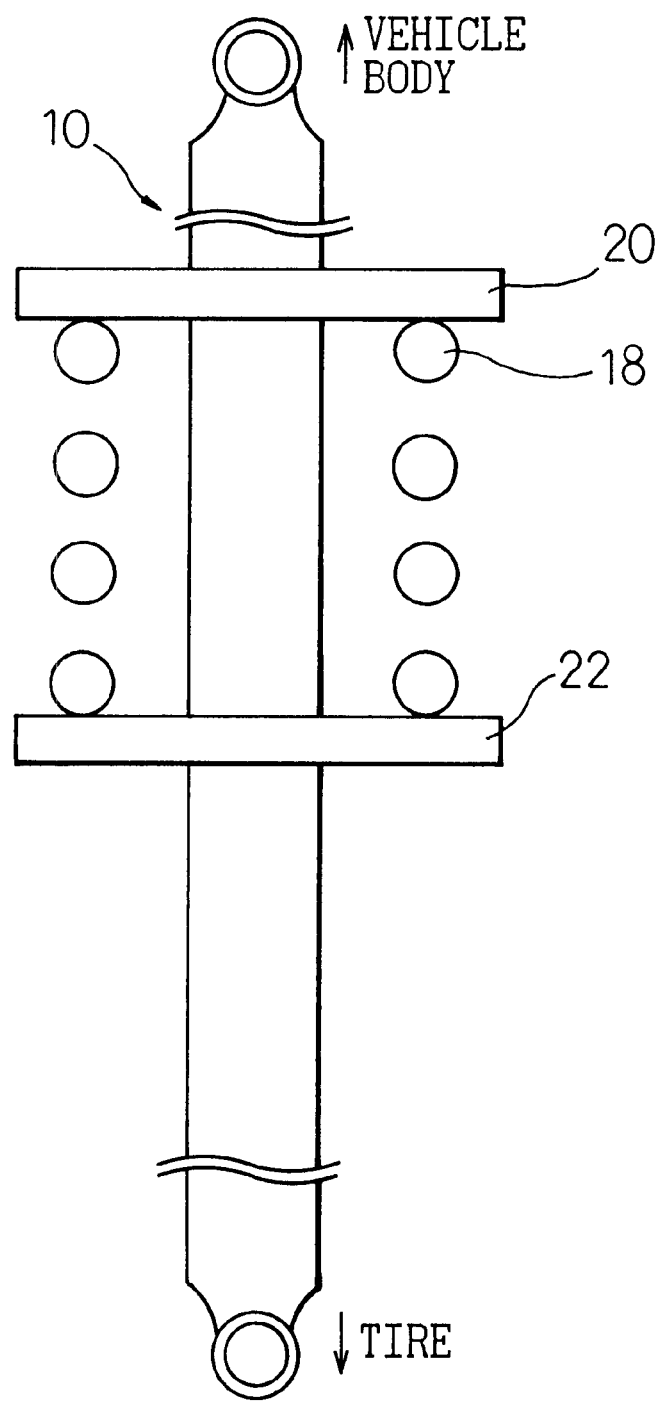
FIG. 2 is a schematic view of a conventional shock absorber known in the prior art.

FIGS. 1 and 2 illustrate a shock absorber in the suspension system of an automobile incorporating therein an apparatus for measuring dynamic load characteristics of wheels of the present invention.

FIG. 1 illustrates a shock absorber 10 that is generally used in an automobile, the upper side thereof being secured to a frame (cross member) 12 of the automobile and the lower side thereof being secured to an axle 16 via a lower arm 14 pivoted to the frame 12.

As is well known, the shock absorber 10 works to moderate the compression when a spring 18 is compressed due to a shock, works to suppress the rebounding of the spring when it extends, thereby to remove and damp the rebounding of the spring as it expands and contracts, in order to maintain the vehicle stable. Referring to FIG. 2, the spring 18 is usually provided between an upper seat 20 of the shock absorber 10 on the side of the main body thereof and a lower seat 22 on the side of the wheel.

Figure 3:
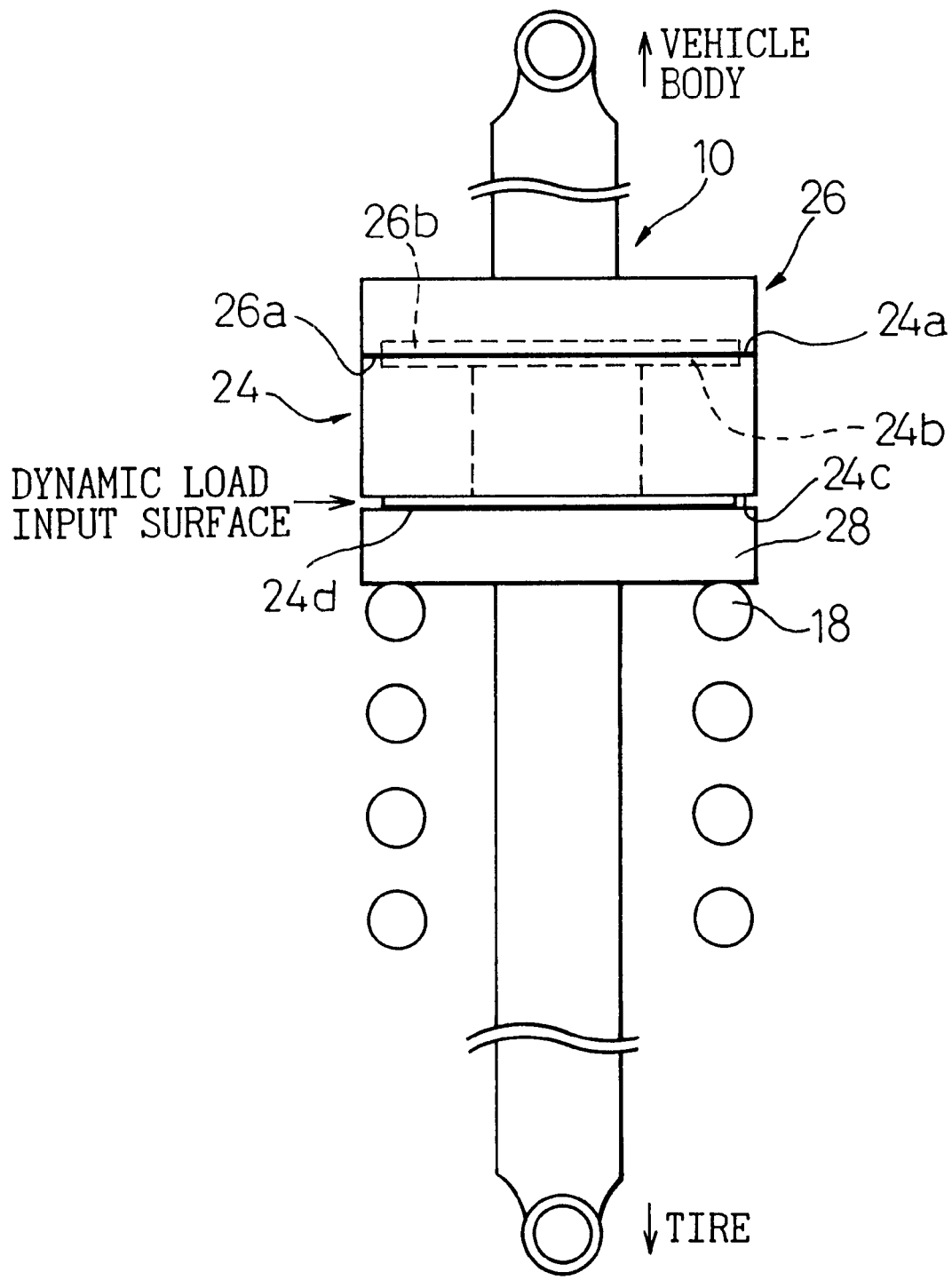
FIG. 3 is a schematic view of a shock absorber according to the present invention incorporating a washer-type strain sensor.

In this embodiment, washer-type strain sensors 24 (load cells) are incorporated in the front and rear, four wheels of the automobile at portions where they receive force from the road surface to measure dynamic loads. FIG. 3 illustrates, for example, a state in which the washer-type strain sensor 24 is held in a portion of the upper seat 20 that receives the spring 18 of the shock absorber. That is, the washer-type strain sensor 24 is held to be sandwiched between a first attachment 26 secured to the main body of the shock absorber and a second attachment 28 that comes in contact with the spring 18. The washer-type strain sensor 24 is attached to each of the four wheels of the automobile.

The first attachment 26 is so formed as will not interfere the displacement of the washer-type strain sensor 24 when it is distorted by the stress from the road surface. Therefore, the first attachment 26 is recessed as designated at 26b on the side thereof where the washer-type displacement sensor 24 is attached, except for the outer circumferential portion 26a thereof. The washer-type strain sensor 24 on the side of the first attachment 26 is recessed as designated at 24b except for the outer circumferential portion thereof. Therefore, even when the washer-type strain sensor 24 is deflected in the up-and-down direction due to stress from the road surface, the strain sensor 24 does not interfere the inner surface in the recessed portion 26b of the first attachment 26 and does not cause error in the measurement.

The second attachment 28 on the side of the spring 18 is formed flat to transmit stress from the road surface to the washer-type strain sensor 24. The washer-type strain sensor 24 on the side of the second attachment 28 has a protruded surface 24d except for the outer circumferential portion 24c thereof. Therefore, stress transmitted from the road surface to the tire is directly transmitted from the second attachment 28 through the protruded surface 24d (load input surface) of the washer-type strain sensor 24.

Figure 4:
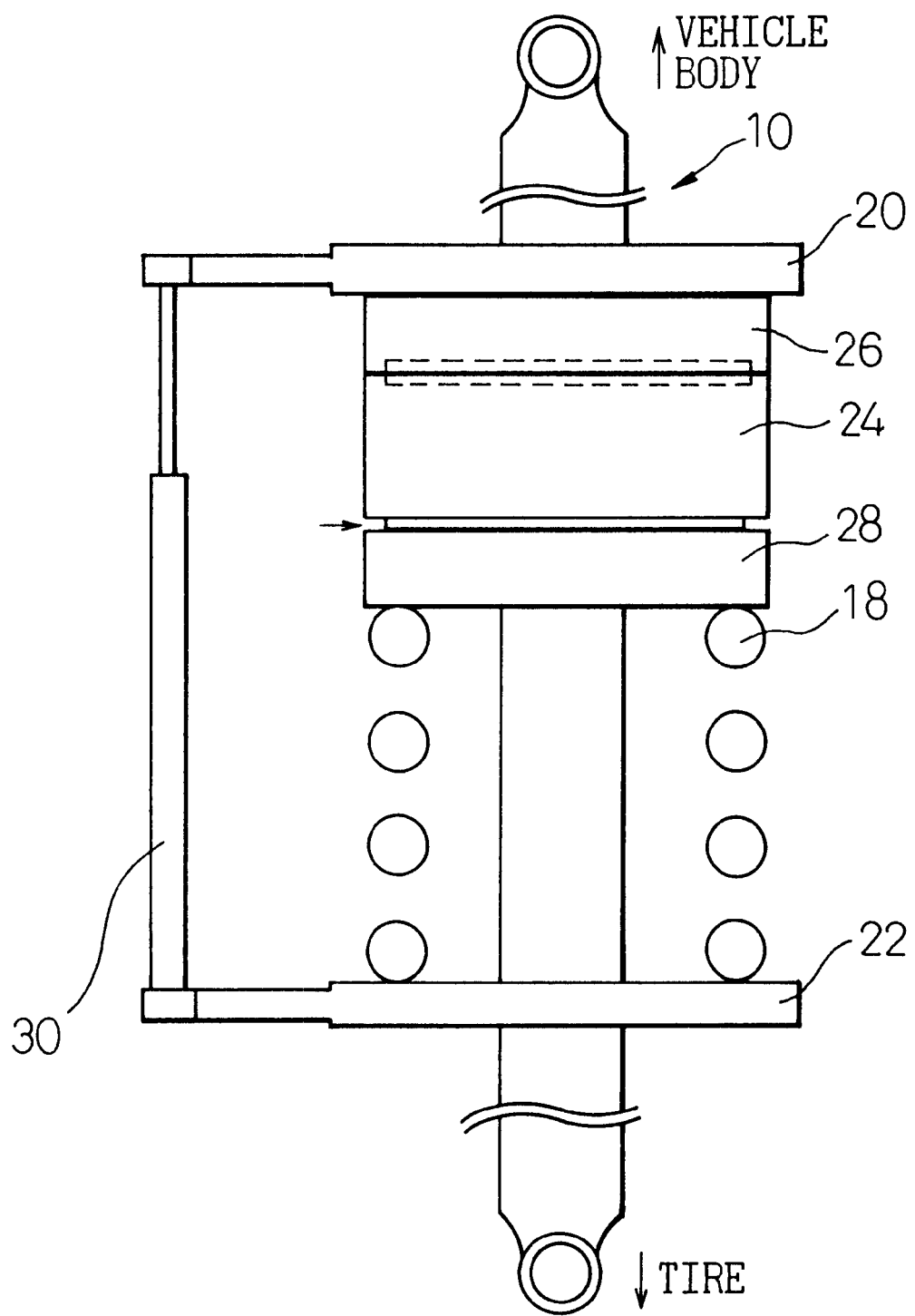
FIG. 4 is a schematic view of a shock absorber according to the present invention incorporating the washer-type strain sensor and a damper stroke sensor.

FIG. 4 illustrates a state where the washer-type strain sensor (load cell) 24 is incorporated in a portion of the upper seat 20 that receives the spring 18 of the shock absorber 10 like in FIG. 3, and, besides, a damper stroke sensor 30 is incorporated in the same shock absorber 10.

The damper stroke sensor 30 is incorporated between the upper seat 20 of the shock absorber 10 on the side of the chassis and the lower seat on the side of the wheel that receives the spring 18, and detects a change in the stroke of the shock absorber 10 while the automobile is traveling.

Figure 5A:
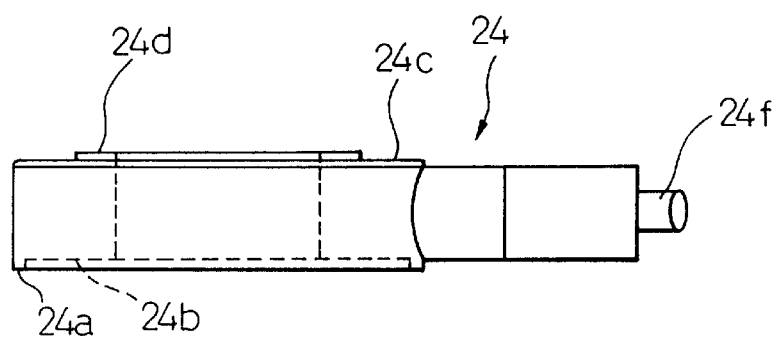
FIG. 5(a) is a side view of the washer-type strain sensor.
Figure 5B:
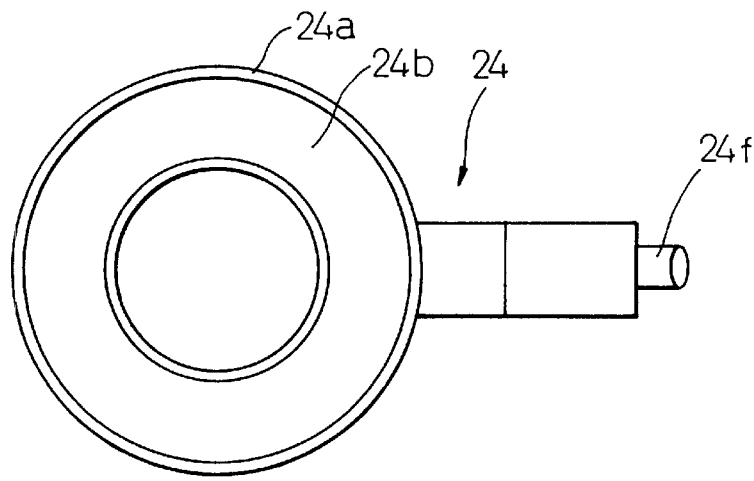
FIG. 5(b) is a plan view thereof.

FIGS. 5(a) and 5(b) illustrate washer-type strain sensor 24 used in this embodiment.

The washer-type strain sensor 24 is nearly of a ring shape. The ring portion forms a sensor portion, one surface (lower surface in FIG. 5(a)) in the axial direction has an inner portion recessed in the axial direction as designated at 24b except for the outer circumferential portion 24a thereof, and the other surface (upper surface in FIG. 5(a)) is protruded as designated at 24d except for the outer circumferential portion 24c thereof. The ring portion forms a sensor portion to which a cable 24f is connected to take out an electric detection signal produced by strain.

FIG. 6 is a diagram illustrating the constitution of a system for measuring a change in the roll caused by the shifting amount of the dynamic load of the wheel, cornering performance of the test tire for the respective dynamic loads, marginal coefficient of friction between the tire and the road surface, etc. The system includes a vehicle speed trigger sensor 32 for detecting the vehicle speed, a steering angle sensor 34 for detecting the steering angle, lateral G/advance G sensor 36 for detecting the gravitational acceleration (G) of the vehicle in the lateral direction and the gravitational acceleration (G) in the back-and-forth direction, a yawing angular velocity sensor 38 for detecting the yawing angular velocity of the wheel, as well as the washer-type strain sensor 24 and the damper stroke sensor 30 shown in FIG. 4. The outputs of the sensors are input to a data logger 42 via an amplifier 40 to obtain the data of the test vehicle.

Figure 7:
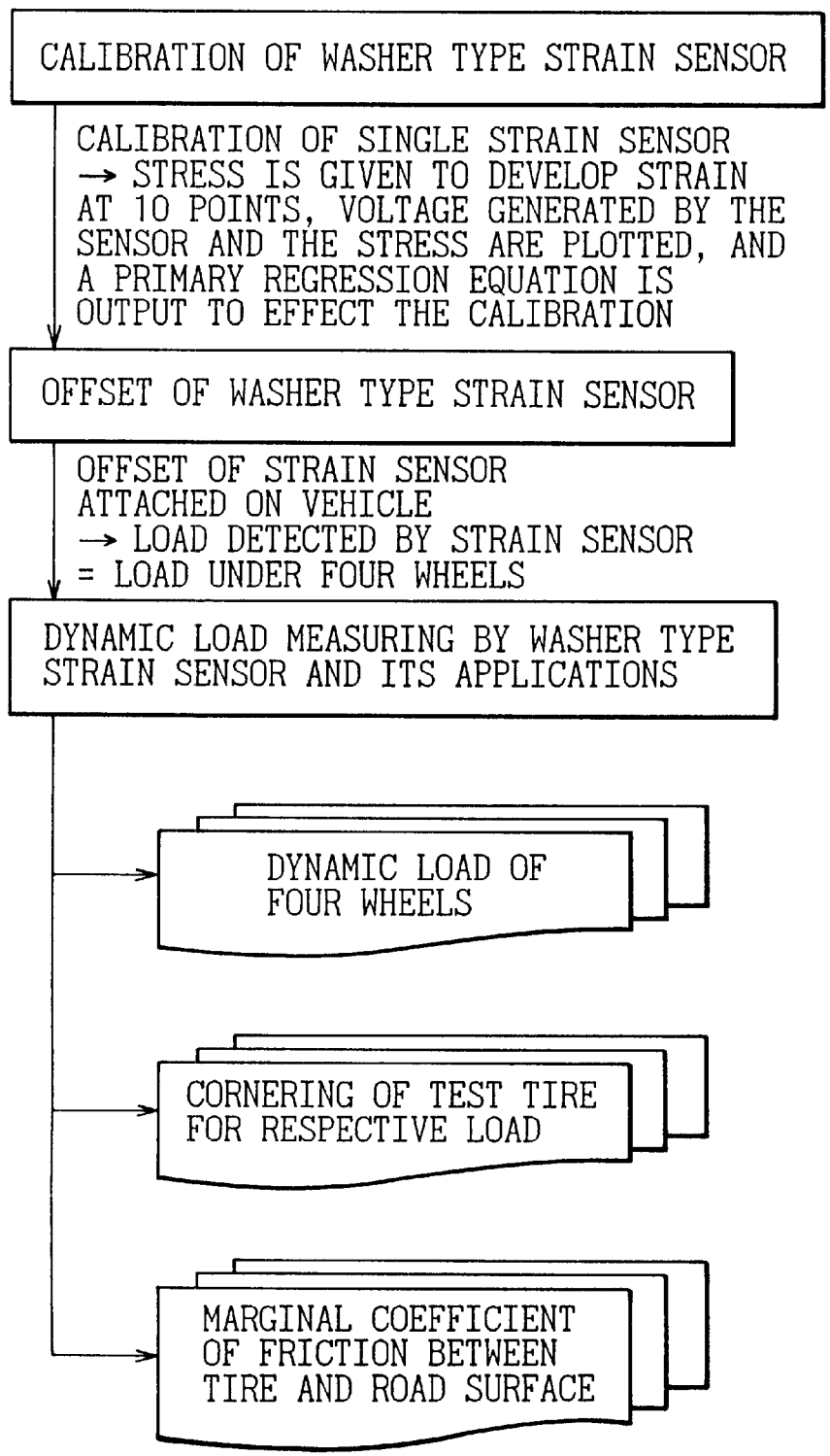
FIG. 7 is a flow chart for measuring a test vehicle.

FIG. 7 is a flow chart illustrating the procedure for measuring the test vehicle.

First, as the washer-type strain sensor 24, an LCW-CS (washer-type load cell)(applied for two tons) manufactured by Kyowa Dengyo Co., Ltd., and the calibration was conducted according to the following procedure. The single washer-type strain sensor 24 was held by a press machine (not shown) to apply a predetermined stress thereto, and strain occurring at that moment was detected in terms of a voltage. The stress given by the press machine was detected at ten points, and the strain (voltage) occurring in the washer-type strain sensor 24 was plotted according to a linear equation to calibrate the washer-type strain sensor 24.

Next, an offset of the washer-type strain sensor 24 was performed. The respective washer-type strain sensors 24 were all calibrated. The loads detected by the respective washer-type strain sensors 24 were set to the load-measuring instruments mounted on the vehicle and placed under the four wheels in order to perform the offset of the washer-type strain sensors 24.

Figure 8:
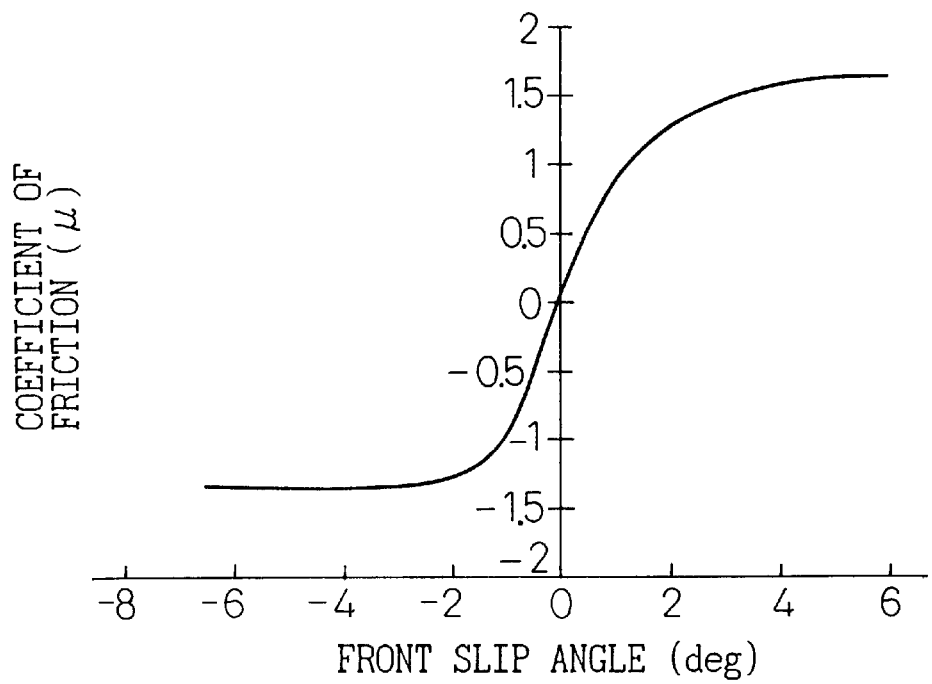
FIG. 8 is a diagram illustrating the measured results of the cornering performance of a test tire for the respective dynamic loads.
Figure 9:
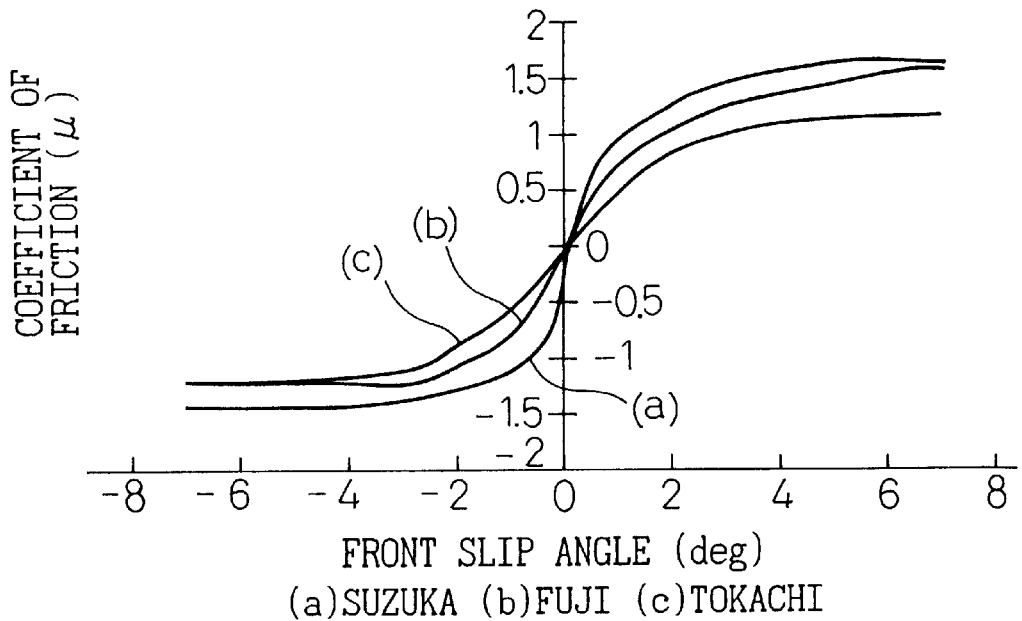
FIG. 9 is a diagram illustrating the measured results of marginal coefficients of friction between the tire and the road surface.

Next, the above washer-type strain sensors 24 were attached to the four wheels of the vehicle to practically take a measurement on the site (circuit) to find the dynamic loads on the four wheels, cornering performance of the test tires for the respective dynamic loads, and marginal coefficient of friction between the tire and the road surface. FIG. 8 shows cornering performance of the test tire attached to the vehicle, and FIG. 9 shows marginal coefficients of friction between the tire and the road surface. The measuring conditions in the experiment were as follows:

Vehicle used for measurement: "Corona Exiv (Trademark)", made by Toyota Motor Co.
Tire: size (front and rear): 210/650R18
rim size: 8.2J×18
pneumatic pressure: 160 kPa Measurement was taken on the site (circuit) by utilizing the measuring system practically mounted on the above-mentioned vehicle. The measuring apparatus was "Pi System" manufactured in Great Britain. The "Pi System" is an integrated system which comprises a hardware including a logger 42 and various sensors, and a software for analyzing the picked-up data. Some of the items were measured by using known sensors in addition to the "Pi System", since the sensors in the "Pi System" were not appropriate to obtain a favorable matching with the vehicle depending upon the items.

The data logger 42 was installed in vacant space in the vehicle where no heat is generated. The vehicle trigger sensor 32 was the one manufactured by Toyota TRD for detecting the revolution of the wheel, and was installed on the inside of the brake caliper (not shown). The steering angle sensor 34 was installed on a steering stroke rod (not shown) that undergoes a change upon turning the steering wheel. Upon calibrating this sensor, a change in the stroke is converted into an angle.

The lateral G/advance G sensor 36 was installed on the center axis of the vehicle at a position as close to the center of gravity of the vehicle as possible. The damper stroke sensor 30 was installed between the upper seat 20 and the lower seat 22 of the shock absorber 10 as shown in FIG. 4, to detect a relative displacement between the upper seat 20 and the lower seat 22. The dynamic load sensor (washer-type strain sensor) 24 was sandwiched in a portion of the upper seat of the shock absorber 10 where it receives the load of the spring.

The data of the test vehicle picked up by the "Pi System" were down-loaded onto the text file to obtain "cornering performance of the test tire" using a predetermined program.

The following relationships are concerned with the "cornering performance of the test tire" of the vehicle.

① Tire cornering force (lateral force, CF characteristics).

Force generated on the grounding surface of the tire in a direction at right angles with the direction in which the tire is traveling presuming that the vehicle is traveling with a marginal lateral G.

② Coefficient of friction $\mu$ (coefficient of lateral force) between the tire and the road surface, that occurs when the vehicle turns.

$\mu$ = lateral force/ dynamic load (measured value)
= lateral G × static load / dynamic load.

③ Slip angle of tire (presuming that the vehicle is steadily turning along a circle with the center of gravity as a center, i.e., turning along a circle of a predetermined radius at a constant speed).

Front slip angle: $\beta f = -\gamma \times Lf/v + \theta/N$
Rear slip angle: $\beta r = \gamma \times Lr/v$ Where v is a vehicle speed, $\gamma$ is a yawing rate (turning angular velocity [deg/sec]), $\theta$ is a steering angle (angle by which the steering wheel is turned), Lf is a distance between the front wheel axle and the yawing rate, Lr is a distance between the yawing rate and the rear wheel axle, and N is a steering gear ratio (ratio of angular change practically given to the axle when the steering wheel is turned).

In FIGS. 8 and 9, the abscissa represents the front slip angle (°) and the ordinate represents the coefficient of friction ($\mu$). FIG. 8 shows the results of cornering performance of the test tire for the respective dynamic loads measured on the Suzuka Circuit, and FIGS. 9(*a*), 9(*b*) and 9(*c*) show marginal coefficients of friction between the tire and the road surface as measured on the Suzuka Circuit, Fuji Circuit and Tokachi Circuit, respectively.

In the foregoing were described in detail the embodiments of the present invention with reference to the accompanying drawings. It should, however, be noted that the invention is in no way limited to the above embodiments only but can be modified or changed in a variety of ways without departing from the spirit and scope of the invention.

What is claimed is:

1. An apparatus for measuring dynamic load characteristics of wheels, in a vehicle suspension system, said apparatus comprising:

a shock absorber provided between a main body of a vehicle and a side of a wheel, a spring provided between an upper seat member connected to a main body side of said shock absorber and a lower seat secured to the side of a wheel, the upper seat member having a first recess; said upper seat member comprising a first attachment secured to said main body side of said shock absorber and a second attachment for receiving an upper end of said spring;

a washer-type strain sensor, said washer-type strain sensor being of a piezoelectric material, and a single, separate element separately incorporated between said first and second attachments, in such a manner that said washer-type strain sensor directly receives a force from a road surface by means of said spring, said washer-type strain sensor having a second recess, enabling a deformation of the washer-type strain sensor into the first recess of the upper seat member;

a sensor for detecting a vehicle speed;

a sensor for detecting a steering angle;

a sensor for detecting a gravitational acceleration (G) in the lateral direction and a gravitational acceleration (G) in the longitudinal direction;

a sensor for detecting a yawing angle of the wheel;

a sensor for detecting a damper stroke; and a sensor that receives signals from these sensors to measure a change in a rolling caused by the shifting amount of dynamic load of the wheel, cornering performance of a test tire for respective dynamic loads, and a marginal coefficient of friction between the tire and a road surface.

2. An apparatus for measuring dynamic load characteristics of wheels in a vehicle suspension system said apparatus comprising;
   a shock absorber provided between a main body of a vehicle and a side of a wheel;
   a spring provided between an upper seat member connected to a main body side of said shock absorber and a lower seat secured to the side of a wheel, the upper seat member having a first recess;
   said upper seat member comprising a first attachment secured to said main body side of said shock absorber and a second attachment for receiving an upper end of said spring;
   a washer-type strain sensor, said washer-type strain sensor being of a piezoelectric material, and a single, separate element separately incorporated between said first and second attachments, in such a manner that said washer-type strain sensor directly receives a force from a road surface by means of said spring, said washer-type strain sensor having a second recess, enabling a deformation of the washer-type strain sensor into the first recess of the upper seat member; and
   a means for measuring an output of the washer-type strain sensor while the vehicle is traveling.

3. An apparatus according to claim 2, wherein a recessed portion is formed in a surface of the first attachment that comes in contact with the washer-type strain sensor except for an outer circumferential portion thereof that comes in contact with the washer-type strain sensor.

4. An apparatus according to claim 2, wherein a recessed portion is formed in a surface of the washer-type strain sensor that comes in contact with the first attachment except for an outer circumferential portion thereof that comes in contact with the first attachment.

5. An apparatus according to claim 2, wherein a recessed portion is formed in a surface of the first attachment that comes in contact with the washer-type strain sensor except for an outer circumferential portion thereof that comes in contact with the washer-type strain sensor and a recessed portion is formed in the surface of the washer-type strain sensor that comes in contact with the first attachment except for an outer circumferential portion thereof that comes in contact with the first attachment.

6. An apparatus according to claim 2, wherein a surface of the washer-type strain sensor that comes in contact with the second attachment is protruded except for an outer circumferential portion, and the protruded surface comes in contact with the second attachment.

* * * * *